Oct. 5, 1926.
M. C. SCHWEINERT
TIRE VALVE REPAIR TOOL
Original Filed Dec. 23, 1919
1,602,127
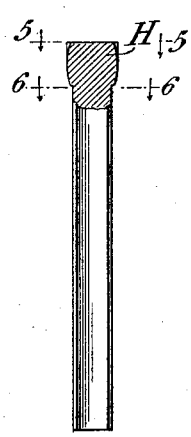
Fig. 4.
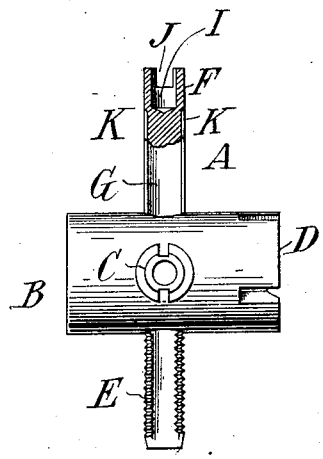
Fig. 1.
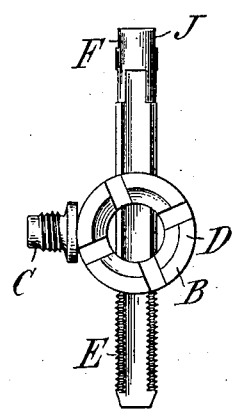
Fig. 2.
Fig. 5.
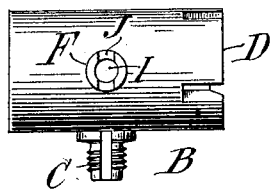
Fig. 3.
Fig. 6.
INVENTOR:
Maximilian Charles Schweinert
By Attorneys,
Fraser, Turk & Myers Patented Oct. 5, 1926.

1,602,127

UNITED STATES PATENT OFFICE.

MAXIMILIAN CHARLES SCHWEINERT, OF NEW YORK, N. Y.

TIRE-VALVE-REPAIR TOOL.

Application filed December 23, 1919, Serial No. 346,994. Renewed November 12, 1925.

This invention relates to repair tools for pneumatic tire valves, and aims to provide certain improvements therein.

In the construction of small hand-repair tools for pneumatic tire valves it is customary to provide a plurality of tools united to one barrel, and among these tools is a screw-driver tool for removing the valve insides. This screw-driver tool has been heretofore formed at the end of a bar which passes through the barrel, the opposite end being utilized to dress the inner threads of the valve casing. In the construction of such a tap and screw-driver a channeled rod is used which is drawn or rolled with the same channeled cross-section throughout, the tap being formed by cutting off a section of the rod and threading one end of it. In the use of such a channeled bar, however, it is found that there is too little metal left to adequately form the screw-driver projections the projections being too fragile for the purpose. According to the present invention I continue to utilize such a bar, but swage or upset one end of it to increase its diameter, so that the screw-driver projections may be made larger and stronger.

In the drawings, wherein I have illustrated one form of the invention,—

Figure 1 is a view of such a composite tool, partly in section;

Fig. 2 is a view at right angles to Fig. 1;

Fig. 3 is an end view, facing the screw-driver tool;

Fig. 4 is an enlarged elevation, partly in section, of the tap and screw-driver bar;

Fig. 5 is a view on the line 5—5 in Fig. 4; and

Fig. 6 is a cross-section on the line 6—6 in Fig. 4.

Referring to the drawing, let A indicate the tool as a whole which usually comprises a barrel B containing a number of different small tools, such as the deflator C, die D, etc. The tap E for the internal threads of the valve and the screw-driver tool F are usually formed at opposite ends of a bar G which is driven through the barrel. The bar G is of channeled stock, which has a cross-section such as is shown in Fig. 6.

In proceeding according to the invention the opposite end of the bar is first enlarged as shown at H in Fig. 4 by a swaging or heading process. This may be effectively done in any pin-heading machine with or without heating. Having formed the head H, which has a cross-section similar to that shown in Fig. 5, I then dress down the end, drill it at I, and slot it at J. The slots, as will be understood, are adapted to engage the lugs of the tire valve inside, and the recess I is adapted to receive the tire-valve deflating pin. By reference to Fig. 3, it will be seen that in the completed tool the screw-driver projection instead of having an angular cross-section may be made circular; and by reference to Fig. 1, it will be seen that the metal extends out beyond the channels K which are present in the original stock. The tool is thus strengthened to the point where it can adequately withstand the strains of use. At the same time the operations are not expensive, and the combined screw-driver and tap can be made nearly as cheaply as heretofore. In addition to the strengthening of the screw-driver end in performing its function as a tool, it will be seen that the walls are made sufficiently thick to adequately withstand the pressing operation which usually takes place when the bar G is forced into the hole through the barrel B.

While I have shown and described one form of the invention, it will be understood that I do not wish to be limited thereto, since various changes may be made therein without departing from the spirit of the invention.

What I claim is:—

1. A tire-valve repair tool comprising among other instrumentalities, a handle member having an integral screw-driver, said handle being made of channeled stock of substantially uniform cross-section, and the screw-driver portion being formed at one end of the handle and reenforced by having the channels of the stock filled up to provide a thickness of metal greater than the smallest diameter of the stock.

2. A tire-valve repair tool comprising among other instrumentalities, a screw-driver integrally formed with a handle member made of channeled stock of uniform cross-section, the screw-driver being formed at one end of the handle and reenforced to form a circular portion of greater diameter than the smallest diameter of the stock, and said portion of larger diameter being slotted at its end to provide the screw-driver projections.

In witness whereof, I have hereunto signed my name.

MAXIMILIAN CHARLES SCHWEINERT.